Nov. 21, 1939.    E. L. MAYO    2,180,760
COOLING SYSTEM FOR VEHICLES
Filed Sept. 13, 1938    2 Sheets-Sheet 1
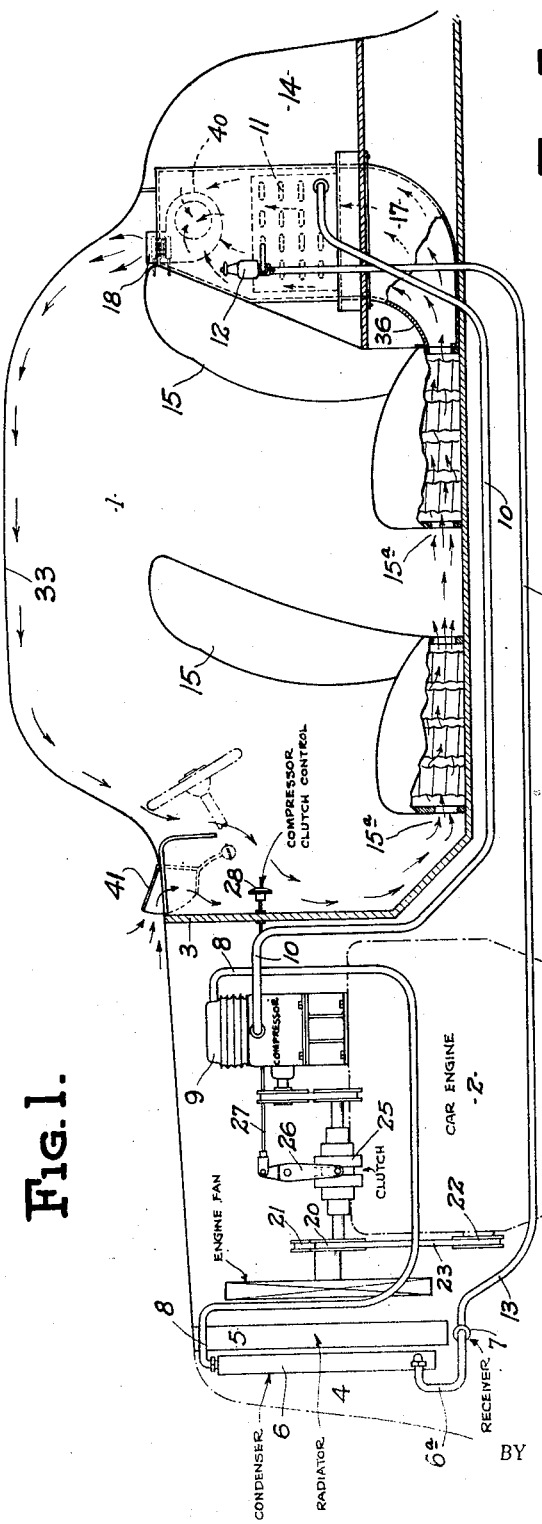
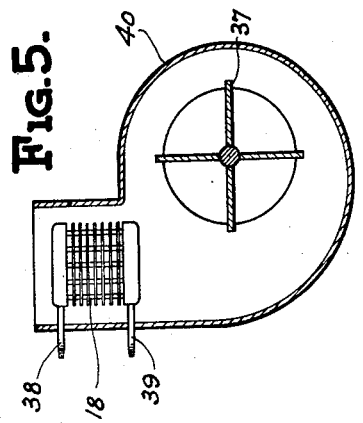
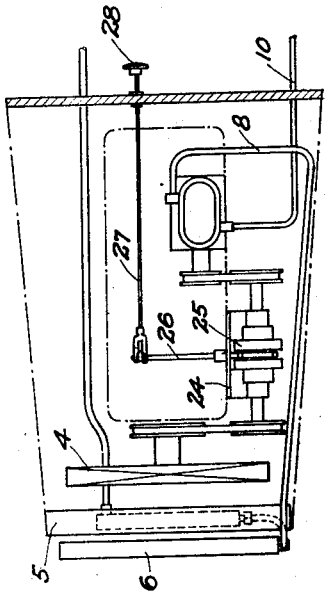
INVENTOR.
Edward L. Mayo.
BY Hull, Brock & West
ATTORNEYS.

Nov. 21, 1939.  E. L. MAYO  2,180,760
COOLING SYSTEM FOR VEHICLES
Filed Sept. 13, 1938   2 Sheets-Sheet 2

INVENTOR.
Edward L. Mayo
BY Hull, Brock & West
ATTORNEYS.

Patented Nov. 21, 1939

2,180,760

UNITED STATES PATENT OFFICE 2,180,760

COOLING SYSTEM FOR VEHICLES

Edward L. Mayo, Cleveland, Ohio, assignor to The Bishop & Babcock Mfg. Company, Cleveland, Ohio, a corporation of Ohio Application September 13, 1938, Serial No. 229,640

2 Claims. (Cl. 62—117)

This invention relates to the supplying of cooled air to the passenger compartment of an automobile.

While it has been known that it is desirable to supply cooled air as well as conditioned air to the passenger compartment of moving vehicles and automobiles in particular, actual installation of devices to accomplish this has not been done because the devices heretofore have been inefficient in their operation, too expensive to install and have been too bulky and therefore reduce the available space in the passenger compartment.

It is the object of this invention to supply cooled aid and to distribute the same properly to the passenger compartment without causing discomfort to the passengers.

It is also the purpose of this invention to take advantage of the present car design and the equipment available to carry off the heated air from around the compressor by mounting it in a suitable place in the air stream of the engine fan both as to the diffusion of hot air and by utilizing the cold air stream from the engine cooling fan for this purpose.

A further object is to provide a device which will accomplish the above without any major changes in the automobile.

An added object of this invention is to supply a device of sufficiently large capacity which will operate from the vehicle engine and which can be installed at a very low cost.

An additional object of the invention is to provide a device that can be installed in such manner as not to interfere with the passengers' comfort and which will not reduce the available space for passengers. A further object is to provide a device which will not be expensive to operate and which will operate from the engine of the vehicle.

It is a further object of this invention to supply an air conditioning device which can be utilized in the summer-time for supplying cooled air to the passenger compartment and in the winter-time for supplying heated air thereto.

Figure 3:
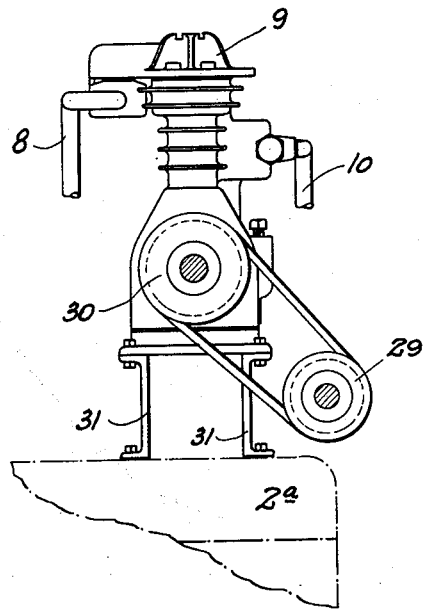
Figure 4:
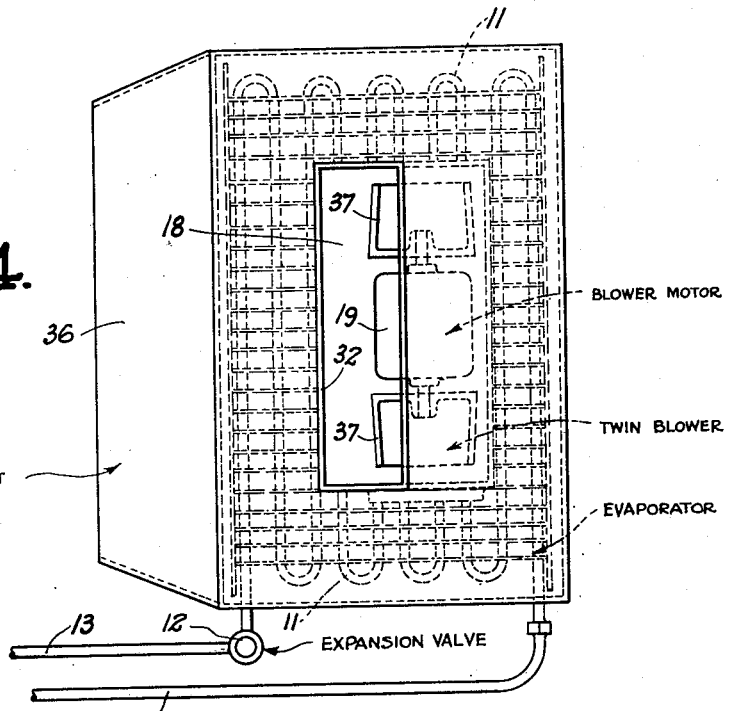

Additional objects and advantages of this invention will appear in the specification and in the drawings in which Fig. 1 is a side view of an automobile equipped with the cooling system as described in this application; Fig. 2 is a plan view of the engine compartment showing the mounting of the compressor and the clutch mechanism for disengaging the compressor; Fig. 3 is an enlarged view of the compressor showing its mounting; Fig. 4 is a plan view showing the blower and evaporator assembly; and Fig. 5 is an enlarged sectional view of the blower and heating coil as mounted in the outlet of the blower housing.

Referring now more in detail to the drawings in which 1 is a motor car having a passenger compartment and an engine 2, the engine being of the usual type having a head 2ª. The engine compartment is separated from the passenger compartment by a suitable customary dash or firewall 3. The engine is equipped with the usual type engine cooling fan 4 mounted immediately behind the cooling radiator 5 of the automobile.

Immediately in front of the radiator 5 a condenser 6 is mounted which is in effect another cooling radiator, but for the cooling of the refrigerant used in this device. The condenser 6 is mounted immediately ahead of the cooling radiator 5 so as to subject it to the air flow striking the automobile when it is in motion. The air passes through the interstices of the condenser 6 and then serves to cool the water in the cooling radiator 5. The refrigerant in the condenser 6 flows to a receiver 7 through pipe 6ª, then through pipe 13 to an expansion valve 12 which is of customary design and which may be thermostatically controlled, then to the cooling coil 11 into pipe 10 to the compressor 9 where it is compressed and forced out through pipe 8 back into the condenser 6. The compressor 9 is mounted on the engine head 2ª directly in the slip stream of the air from the fan by means of brackets 31 which raise the compressor from the engine head permitting an air stream from the engine fan 4 to pass underneath and around the compressor thereby driving off any heat which may have accumulated. The compressor is driven by a series of pulleys and belts as follows:

In the present type passenger car, fan pulley 21 is attached to the fan shaft which is driven by some suitable means off the engine 2. A belt engages the fan pulley 21 and the generator pulley 22 and at the same time a pulley 20 which is connected by a suitable shaft to the clutch mechanism 25 which in turn carries pulley 29 which drives by means of a suitable belt pulley 30 mounted directly on the compressor. The clutch mechanism 25 can be operated in such a way by means of the clutch control linkage 26, 27 and clutch lever 28 which extends into the passenger compartment through the dash 3 so that at any time the compressor may be put out of operation by operation of the clutch disengaging mechanism.

The passenger compartment has the usual seats 15 which have air inlets and outlets 15ᵃ in the material covering the cushions to permit air to pass in and out of the seat cushions between the springs. The rear outlet 15ᵃ communicates directly with a conduit 17 which leads to a housing 36 which entirely encloses the cooling coil 11 and the blower mechanism which is mounted in the trunk compartment 14 of the automobile where it will be entirely out of the way of passengers. The blower mechanism has an outlet immediately behind the rear seat 15 and near the top portion thereof.

It will now be seen that when the compressor has been put into operation the refrigerant circulates through the system, and the blower mechanism, which may consist of any commercial design but has in this particular instance been illustrated by having an electric motor 19 and twin fans 37, is put into operation, which may be done manually or thermostatically, air will be forced into the passenger compartment after it has been drawn through the duct 17 over the cooling coils 11 where it has been cooled to the desired temperature. The circuit of air in other words is as follows: The air in the passenger compartment is drawn out of the body of the car through ducts 17, passed over cooling coil 18 where it is brought to the desired temperature, forced out by the blower into the passenger compartment in such a way that it will strike the generally elliptical shaped roof 33 of the car and will take its way as indicated by the arrows in Fig. 1 by circulating through the car through the openings 15ᵃ back into the duct 17. The cool air impinges against the top 33 and then partially by force and partially by gravity mixes with the warmer air of the passenger compartment. If it is desired to add outside air to the air already in the passenger compartment it will only be necessary to open the cowl ventilator 41.

While any desired blower mechanism may be employed as well as the one illustrated in the drawings a preferable device is a twin blower heating mechanism illustrated in United States Letters Patent No. 2,024,440 which can then alternately be used as a heater having a heating coil 18 mounted in the opening of the blower housing 40 in such a way that when the blower is in operation air will be forced through the heating coil 18 which is supplied with hot water from the cooling system of the engine by means of inlet and outlet connections 38 and 39 which lead to the engine radiator. These connections are not shown.

When it is desired to supply cooled air to the passenger compartment the supply of hot water to the hot air radiator 18 is discontinued by means of suitable shut-off mechanisms which are not a part of this invention and the blower consisting of motor 19 and twin fan 37 operates merely to draw air over the cooling coils and blow it into the passenger compartment.

When it is desired to operate the system as a device for supplying heated air to the passenger compartment, the compressor clutch 25 is disengaged as heretofore stated and hot water is supplied to the heating radiator 18 from the engine cooling system whereupon the blower mechanism will force air into the passenger compartment through the heating radiator 18.

What has been described is a simple, efficient air-cooling and heating device which employs few parts and is capable of being operated alternately as the temperature of the weather demands and which in no way interferes with the usual operation of the automobile.

Having thus described my invention, what I claim is:

1. In a system for cooling the passenger compartment of an automobile having an engine, a radiator mounted in advance of said engine and permitting passage of air for cooling said engine, and a fan mounted in advance of said engine to provide flow of air for cooling said engine, a condenser, an evaporator in a passageway leading to said passenger compartment and an air-cooled compressor connected for circulation of a refrigerant through said evaporator and condenser in a closed circuit, means supporting said compressor directly above and spaced from the top of the engine and within the effective cross area of the cooling air, said means permitting a substantial unobstructed flow of said cooling air through the space between said compressor and engine.

2. In a system for cooling the passenger compartment of an automobile having an engine, a radiator mounted in advance of said engine and permitting passage of air for cooling said engine, and a fan mounted in advance of said engine to provide flow of air for cooling said engine, a condenser, an evaporator in a passageway leading to said passenger compartment and an air-cooled compressor connected for circulation of a refrigerant through said evaporator and condenser in a closed circuit, and a skeleton bracket carried by said engine, said compressor being mounted on said skeleton bracket directly above and spaced from the top of the engine said compressor and bracket lying within the effective cross area of the flow of the cooling air.

EDWARD L. MAYO.